United States Patent [19]

Shimokawa et al.

[11] 4,097,319
[45] Jun. 27, 1978

[54] METHOD OF MANUFACTURING A COMPOSITE FOAMED POLYOLEFIN SHEET

[75] Inventors: Hayao Shimokawa, Ebina; Makoto Nakamuri; Hideyo Ueno, both of Hiratsuka; Isamu Namiki, Yokohama; Naonori Shiina, Tokyo, all of Japan

[73] Assignee: The Furukawa Electric Co., Ltd., Tokyo, Japan

[21] Appl. No.: 660,855

[22] Filed: Feb. 24, 1976

[30] Foreign Application Priority Data

Feb. 26, 1975 Japan ................................. 50-23681

[51] Int. Cl.² ............................................. B29D 27/00
[52] U.S. Cl. ..................................... 156/79; 156/272; 156/497; 264/22; 264/45.9; 264/54; 264/DIG. 18; 428/315
[58] Field of Search ................... 264/51, 54, DIG. 18, 264/22, 45.9; 156/79, 306, 272, 497; 428/315

[56] References Cited
U.S. PATENT DOCUMENTS

| | | |
|---|---|---|
| 3,141,595 | 7/1964 | Edwards ............................ 156/79 X |
| 3,463,687 | 8/1969 | Folsom et al. ........................ 156/79 |
| 3,562,043 | 2/1971 | Eddy .................................... 156/79 |
| 3,608,006 | 9/1971 | Hosoda et al. ............... 264/DIG. 18 |
| 3,655,470 | 4/1972 | Takeshima et al. ...................... 156/79 |
| 3,692,602 | 9/1972 | Okada et al. ........................... 156/79 |
| 3,819,796 | 6/1974 | Webster et al. ............. 264/DIG. 18 |
| 3,959,545 | 5/1976 | Siedenstrang ..................... 264/54 X |
| 4,020,207 | 4/1977 | Alfter et al. ...................... 428/315 X |
| 4,049,147 | 9/1977 | Stiles et al. ....................... 428/315 X |

FOREIGN PATENT DOCUMENTS 47-42949  10/1972  Japan ..................................... 156/79

Primary Examiner—Philip Anderson
Attorney, Agent, or Firm—Carroll F. Palmer

[57] ABSTRACT

A method of manufacturing a foamed polyolefin sheet which comprises the steps of laminating a film of non-cross-linked thermoplastic resin free from a cross-linking agent to at least one surface of a cross-linked polyolefin base sheet containing a thermally decomposable foaming agent or a polyolefin base sheet containing the above-mentioned foaming agent and a cross-linking agent, and carrying out the thermal foaming of said film-fitted sheet while placing it on a supporting member under atmospheric pressure with the film-laminated surface of the polyolefin sheet being in contact with said supporting member.

13 Claims, 1 Drawing Figure

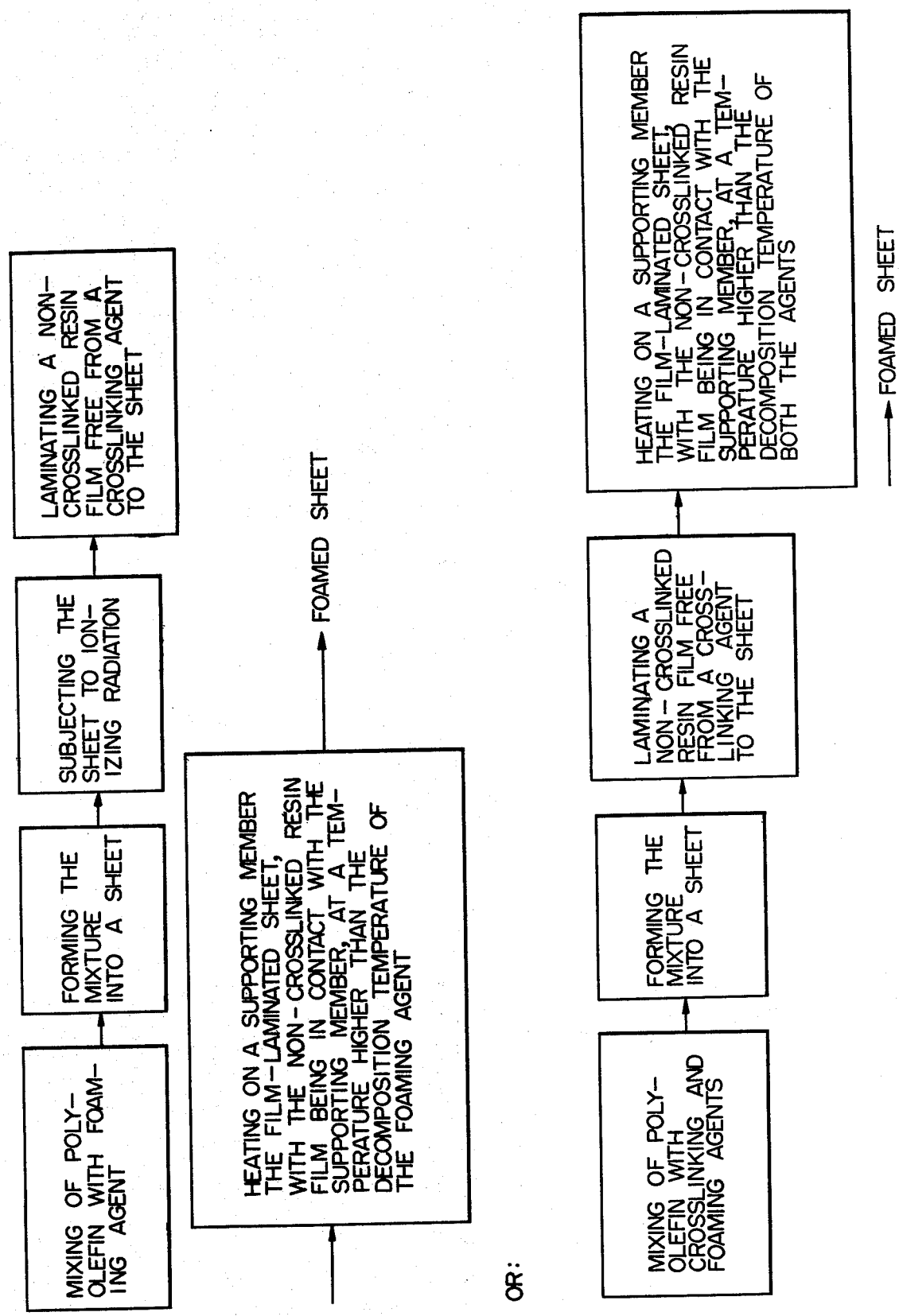

METHOD OF MANUFACTURING A COMPOSITE FOAMED POLYOLEFIN SHEET

This invention relates to a method of manufacturing a foamed polyolefin sheet and more particularly to a method of manufacturing a cross-linked foamed polyolefin sheet, which prevents a foamed polyolefin base sheet from sticking to, for example, a supporting member carrying said base sheet, thereby providing a foamed polyolefin sheet having a smooth surface and displaying good thermal workability.

Foamed plastics material generally has desirable properties including light weight, heat insulation, sound absorption, and shock absorption and is used in wide applications, for example, a structural material, packing material and floating material. Among others, a foamed polyolefin sheet has a proper degree of mechanical strength, excellent flexibility in particular and is little subject to permanent set, namely, is characterized by more desirable qualities than any other foamed plastics material, and consequently is favorably accepted in various fields of industry. A cross-linked foamed polyolefin sheet in particular is more improved than a non-cross-linked foamed polyolefin sheet in respect of heat resistance which represents the common weak point of general foam, and consequently is characterized by good thermal workability.

The above-mentioned cross-linked foamed polyolefin sheet should be manufactured by mixing a cross-linking agent and foaming agent with raw polyolefin, forming the mixed mass into a sheet in shape, and thermally foaming said sheet. However, this process has presented difficulties in producing the cross-linked foamed polyolefin sheet, because the foamable sheet, while heated for foaming, still remains in a molten state and often tends to stick to a supporting member carrying the sheet thereon, with the result that the foamed sheet, fails to be easily separated therefrom.

In view of the above-mentioned drawbacks, the present inventors previously proposed a method (U.S. Pat. No. 3651183) of manufacturing a cross-linked foamed polyolefin sheet, which comprises mixing a cross-linking agent and a foaming agent having a higher decomposition point than said cross-linking agent with the raw polyolefin, forming the mixed mass into a sheet in shape, supporting the sheet on a supporting member of a wire net conveyor and heating the sheet by hot air in a furnace under atmospheric pressure to effect the foaming of said sheet. The above-mentioned proposed method further includes the process of supporting the foamable sheet on the wire net conveyor and applying strong heat only to the surface of the foamable sheet before carrying out its foaming in a furnace. According to the first mentioned method, reduction of a contact area between the foamable sheet and wire net supporting member, and hot air heating enable the foamed sheet to be easily separated from the wire net supporting member and moreover effect uniform heating. The latter process more facilitates the removal of the foamed sheet from the wire net supporting member.

Where, however, the raw resin consists of polyolefin having a high melt index, or ethylene-vinyl acetate resin or said polyolefin or ethylene-vinyl acetate resin mixed with a flame retardant such as antimony oxide or halogen compounds, or with rubber or wax to improve softness, then a foamable sheet prepared from the above-mentioned resin or mixtures thereof presented high stickiness to the supporting member when melted for foaming. Therefore, any of the aforesaid proposed processes failed to attain the easy separation and in consequence the efficient manufacture of a foamed sheet.

In view of the above-mentioned circumstances, the present inventors continued further studies and as a result, have found that when a film of noncross-linked thermoplastic resin free from a cross-linking agent is fitted to at least one surface of a cross-linked polyolefin base sheet containing a thermally decomposable foaming agent or a polyolefin base sheet containing a foaming agent and cross-linking agent and said film-laminated sheet is heated to foam under heat at atmospheric pressure with the film-laminated surface of said sheet being in contact with a supporting member, then said sheet can be efficiently foamed regardless of its composition without sticking to the support member, and that surface of the resultant foamed polyolefin sheet which faces the supporting member presents a smooth surface.

The Japenese Pat. No. 691,761 sets forth a process of producing a white foamed polyolefin sheet which consists of cross-linking a polyolefin base sheet containing a foaming agent, laminating a cross-linked film or a film containing a cross-linking agent to both surfaces of said cross-linked polyolefin base sheet and heating on a bath of molten metal salt the foamable laminate polyolefin sheet, thereby highly improving effective foaming ratio which is a ratio of an amount of gas by volume ($cm^3$) contained in the foam thus obtained to that of total gas evolved from the foaming agent used. Where, however, the foamable polyolefin base sheet sandwiched between the above-mentioned films is actually foamed while being supported on, for example, a wire net, then said cross-linked films on the surfaces of said base sheet tends to stick to the wire net supporting member, fails to have a smooth surface and presents difficulties in being stretched with the resultant occurrence of cracks. Moreover, the polyolefin sheet thus foamed prominently shrunk when reheated for press molding or vacuum forming. Further, U.S. Pat. No. 3,655,470 discloses a process of producing a foamed thermoplastic resin sheet by laminating a film free from a foaming agent to both surfaces of a base sheet of foamable thermoplastic resin and foaming said base sheet while supporting it on a wire net. This U.S. patent process, however, simply consists of foaming a base sheet of polyvinyl chloride resin containing a foaming agent after laminating a film of polyvinyl chloride resin free from a foaming agent to said base sheet. Unlike the present invention, the U.S. patent does not include the process of cross-linking a base sheet. As naturally expected, therefore, the foamed sheet obtained by said U.S. patent does not stick to a supporting member. Nor is roughened that surface of the resultant foamed sheet which faces the supporting member. Accordingly, said U.S. patent is quite different from this invention which is characterized by laminating a noncross-linked film to a foamable base sheet and cross-linking said base sheet. In short, said U.S. patent does not offer a process of eliminating the drawback. The reason is that cross-linked or cross-linkable thermoplastic resin itself, while being heated and placed on a supporting member, tends to stick to the supporting member, and is therefore difficult to take off therefrom.

The object of this invention is to provide a method of manufacturing a foamed polyolefin sheet, which comprises the steps of laminating a noncross-linked thermoplastic resin film free from a cross-linking agent to at least one surface of a base sheet of cross-linked polyolefin containing a thermally decomposable foaming agent or a base sheet of polyolefin containing said foaming agent and a cross-linking agent and heating for foaming said film-laminated sheet under atmospheric pressure with the film-laminated surface of the sheet being in contact with a supporting member.

The new methods of this invention may be more fully understood by reference to the appended flow sheet. Either a method employing an ionizing radiation or a method using a cross-linking agent can be used in this invention for obtaining the desired product of cross-linked polyolefin foam. As shown in the upper level of the appended flow sheet, the method of this invention for the case of utilizing ionizing radiation comprises:

a first step of mixing a foaming agent into polyolefin, a second step of forming the mixture into a sheet, a third step of subjecting the sheet to ioning radiation for crosslinking the polyolefin, a fourth step of laminating a non-crosslinked resin film free from a crosslinking agent to the crosslinked sheet, and a fifth step of heating on a supporting member the film-laminated sheet, with the non-crosslinked resin film being in contact with the supporting member, at a temperature higher than the decomposition temperature of the foaming agent.

The lower level of the appended flow sheet denotes the case of using a crosslinking agent. As shown in the drawing the method of this invention for this case comprises:

a first step of mixing foaming and crosslinking agents into polyolefin, a second step of forming the mixture into a sheet, a third step of laminating a non-crosslinked resin film being in contact with the supporting member, at a temperature higher than the decomposition temperature of both the agents to form a foamed sheet.

There will now be detailed the method of this invention for manufacturing a foamed polyolefin sheet. The method of the invention uses a base sheet of cross-linked polyolefin containing a thermally decomposable foaming agent or a base sheet of polyolefin containing said thermally decomposable foaming agent and a cross-linking agent.

The former polyolefin base sheet is prepared by mixing a thermally decomposable foaming agent with raw polyolefin, forming the mixed mass into a sheet in shape by an ordinary process, and irradiating ionizing radiation on the sheet for cross-linking. The latter polyolefin base sheet is prepared by mixing the aforesaid foaming agent and a cross-linking agent with the raw polyolefin and forming the mixed mass into a sheet in shape by a customary process.

The raw polyolefin used in the method of this invention includes polymers of, for example, ethylene, propylene and butene, copolymers of said olefins and, for example, vinyl acetate or acrylic acid, or mixtures of said polymers and copolymers. If necessary, it is possible to mix the above-defined raw polyolefin with rubber or plastics material miscible therewith in a smaller amount than said raw polyolefin.

The thermally decomposable foaming agent is of the type which thermally decomposes itself to evolve gas and includes, for example, p,p'-oxybis(benzene sulfonyl hydrazide), azodicarbonamide, dinitrosopentaethylenetetramine and p-toluene-sulfonyl semicarbazide. Where the foaming agent is applied jointly with a cross-linking agent, said foaming agent is preferred to have a higher decomposition temperature than that of the cross-linking agent.

The cross-linking agent may be of ordinary type, such as of organic peroxides, for example, dicumyl peroxide; azides, for example, 1,10-decane-bis-sulfonazide and m-phenylenediazide; silane compounds having a vinyl group, for example, vinyltriethoxysilane and vinyltrimethoxysilane; and silanol condensation catalyst, for example, dibutyltin dilaurate and dibutyltin diacetate. Sometimes, triallyl cyanurate and triallyl isocyanurate may be used as a cross-linking coagent. The amount of foaming agent and cross-linking agent mixed with a raw polyolefin should advisably be determined according to, for example, heating temperature for foaming and applications for which the product of foamed polyolefin sheet is intended.

According to the method of this invention, a film of noncross-linked thermoplastic resin free from a cross-linking agent is laminated to one or both surfaces of a polyolefin base sheet. The film-laminated sheet is heated under atmospheric pressure on a movable supporting member with the film-laminated surface of the base sheet being in contact with the supporting member. It is preferred to place the film-laminated sheet on a wire net conveyor and heat the sheet by hot air in a furnace for the cross-linking and foaming of the polyolefin sheet.

The thermoplastic resin film will well serve the purpose if it can be stretched while being closely attached to the polyolefin base sheet to the same extent as that to which said base sheet expands. Form this point of view, the thermoplastic resin film is usually preferred to be of the same type as the polyolefin base sheet. However, the film need not be limited to this type, but may be formed of others. A film made of polyethylene, or polypropylene is favorably accepted as the thermoplastic resin film used in this invention. It is generally desired to use a film formed of polymer having a small melt index or high melting point due to its low stickiness. The thermoplastic resin film laminated to a polyolefin base sheet is generally chosen to have a thickness of 0.05 to 1 mm, or preferably 0.2 to 0.5 mm. When the polyolefin base sheet expands, the film is usually stretched to such an extent that its original thickness is reduced to one-tenth, constituting a skin of the foamed polyolefin sheet. Where the above-mentioned thermoplastic resin film is laminated only to one surface of a polyolefin base sheet and said sheet is heated for foaming while being placed on a supporting member such as a wire net conveyor, then it is necessary to mount the film-laminated sheet on the supporting member with the film-laminated surface of the polyolefin base sheet being in contact with said supporting member. The thermoplastic resin film is customarily laminated on a foamable polyolefin base sheet, after the sheet is prepared. However, it is possible to extrude a polyolefin base sheet and a thermoplastic resin film at the same time by two extruders respectively and cover the whole surface of the polyolefin base sheet with the thermoplastic resin film. Further, it is possible to apply plastics powder on the surface of a foamable polyolefin base sheet and melt said powder or coat a plastics solution on said surface followed by drying, instead of laminating a thermoplastic resin film thereto.

As previously described, the method of this invention comprises fitting a film of noncross-linked thermoplastic resin free from a cross-linking agent to a cross-linked foamable polyolefin base sheet or a foamable polyolefin base sheet containing a cross-linking agent and thermally foaming said polyolefin film-fitted sheet while placing said sheet on a movable supporting member. Namely, said cross-linked polyolefin base sheet of polyolefin base sheet containing a cross-linking agent is thermally foamed without its directly touching the supporting member, but indirectly supported through the medium of the aforesaid thermoplastic resin film. Therefore, the foamed sheet does not stick to the supporting member, and can be easily taken off therefrom.

Though the reason for such favorable effect has not yet been clearly defined, it is assumed that a thermoplastic resin film free from a cross-linking agent is little oxidized and has a lower stickiness to the supporting member than a cross-linked polyolefin base sheet. Further, the method of this invention allows a foamable base sheet made of one kind of material to be laminated with a film formed of another kind of material. Therefore, it has become possible to foam continuously and easily even a polyolefin sheet consisting of an ethylene-vinyl acetate copolymer containing a large amount of vinyl acetate group or mixed with a flame retardant such as antimony oxide or chlorinated paraffin which has hitherto been regarded as unusable because, when foamed, it is highly liable to stick to a supporting member, by laminating a film made of, for example, polyethylene to said polyolefin sheet.

Another reason why a polyolefin sheet foamed with the laminated film being in contact with a supporting member does not stick to the supporting member is presumably that a cross-linked polyolefin base sheet has a property of uniformly expanding in three dimensional directions; release of gas through the film fitted to the polyolefin base sheet is more restricted than that of gas from the upper surface of a polyolefin base sheet which has no film thereon, leading to the larger expansion of the underside of the polyolefin base sheet, and consequently causing the both longitudinal ends of the foamed polyolefin sheet to be curved upward, that is, in the form of a gutter laid horizontally relative to the surface of a supporting member; and the film-fitted foamed polyolefin sheet is carried forward under this condition while being supported on the supporting member. Where, therefore, a film is laminated also to the upper side of a polyolefin base sheet, said upper side film should preferably have a higher gas permeability than the lower side film.

Where, according to this invention, a polyolefin base sheet on which the aforesaid thermoplastic resin film is laminated is thermally foamed by hot-air heating in a furnace while being supported on a wire net conveyor received therein, then said film-laminated sheet thus foamed is more easily separated from the wire net supporting member. A wire net used as said supporting member is generally made of stainless steel and has 10 to 100 meshes or preferably 30 to 50 meshes. Where a polyolefin base sheet laminated with a film of noncross-linked thermoplastic resin free from a cross-linking agent is foamed while being supported on the supporting member, then that surface of the resultant foamed sheet which faces the supporting member presents an attractive, smooth surface. This is supposed to be because, when heated on a supporting member, a cross-linked polyolefin base sheet or a polyolefin base sheet containing a cross-linking agent is thermally deteriorated due to overheating, unless the base sheet has a noncross-linked thermoplastic film free from a cross-linking agent thereon, whereas a noncross-linked thermoplastic film free from a cross-linking agent is little liable to thermal deterioration due to overheating and presents a smooth surface. Laminating of a thermoplastic resin film to a polyolefin base sheet has the advantage that when the base sheet is heated for foaming, gases evolving from a foaming agent or cross-linking agent contained in the base sheet are shut up in the base sheet itself by the laminated film and prevented from escaping to the outside, thereby suppressing air pollution by gases, and moreover when the base sheet is thermally foamed, the laminated film checks the occurrence of cracks on the surface of the foamed base sheet which might otherwise result from the oxidation of said surface, thus enabling a foamed polyolefin sheet to be manufactured with a larger thickness than has been possible in the past.

According to this invention, a foamed polyolefin base sheet of high heat resistance covered with a noncross-linked film skin can be heat laminated with other materials at a relatively low temperature and under a stable condition. The film skin has an extremely uniform thickness and is little subject to fructure, presenting prominent water-proofness.

This invention will be more fully understood with reference to the following examples, in which parts are expressed by weight.

EXAMPLE 1

100 parts of low density polyethylene having a melt index of 1 was homogeneously mixed with 15 parts of azodicarbonamide, and 1 part of dicumyl peroxide. The mixed mass was extruded into a base sheet 350 mm wide and 1.7 mm thick. A 0.3 mm thick film formed of similar low density polyethylene was laminated to the underside of the above-mentioned base sheet. The laminated sheet was heated for 5 minutes by hot air at 220° C in a furnace while being supported on a wire net conveyor to foam the aforesaid sheet. The foamed polyethylene sheet thus obtained had a width of 1000 mm, a thickness of 6 mm and a density of 0.035 g/cc, and had its underside covered with a film skin of uniform thickness. The underside of said foamed sheet presented a smooth surface. A foamed polyethylene sheet was produced continuously for 72 hours. However, the foamed polyethylene sheet did not stick to the wire net conveyor at all.

CONTROL 1

A high pressure polyethylene base sheet consisting of the same material as in Example 1 was foamed in the same manner as in Example 1, with the polyethylene film laminated to the upper surface on the base sheet. The foamed polyethylene sheet thus obtained had a tendency to become sticky and indicated traces of adhesion to the wire net in several places. Consequently, that side of the foamed polyethylene sheet which faced that wire net did not present a smooth surface.

EXAMPLE 2

The low density polyethylene film laminated to the low density polyethylene base sheet of Example 1 containing a foaming agent and cross-linking agent was replaced by a polypropylene film having the same thickness as said low density polyethylene film. Foaming was carried out in the same manner as in Example 1. The foamed polyethylene sheet thus obtained had a good surface appearance like the product of Example 1 and did not stick to the wire net conveyor. That surface of the foamed polyethylene sheet on which the polypropylene film was laminated was very smooth.

EXAMPLE 3 foamed 100 parts of ethylene-vinyl acetate copolymer (having a melt index of 2 and containing 25% of vinyl acetate) was mixed with 15 parts of azodicarbonamide, and 0.5 part of dicumyl peroxide. The mixed mass was extruded into a base sheet 350 mm wide and 1.4 mm thick. A 0.1 mm thick high density polyethylene film (having a density of 0.96 and a melt index of 2) was laminated to the upper surface of the sheet and a 0.3 mm thick film of the same material was laminated to the underside of said base sheet. The laminated sheet was heated to 230° C while being supported on a stainless steel net conveyor received in a furnace to foam the laminated sheet. The foamed sheet did not stick to the stainless steel net at all. The foame sheet thus obtained had a density of 0.035 g/cc and displayed a smooth surface.

In contrast, a base sheet consisting of the same material as described above, but lacking the high density polyethylene film stuck to the stainless steel net when foamed under the same conditions, and failed to present a smooth surface.

EXAMPLE 4

100 parts of low density polyethylene having a melt index of 2 was first mixed with 15 parts of chlorinated paraffin, 15 parts of antimony trioxide and 1 part of basic magnesium carbonate and then 10 parts of azodicarbonamide and 1 part of dicumyl peroxide. The mixed mass was extruded into a base sheet in the same manner as in Example 3 and the same kind of film as used in Example 3 was laminated to both surfaces of the base sheet. The laminated sheet was heated to foam the base sheet. The foamed sheet thus obtained had a density of 0.06 g/cc, showed a smooth surface and proved flame retardant.

In contrast, where the high density polyethylene film was omitted, the foamed sheet struck to the supporting member when thermally foamed in the same manner as in Example 3, and failed to have a smooth surface.

CONTROL 2

The low density polyethylene film fitted to the foamable base sheet used in Example 1 was replaced with a low density polyethylene film cross-linked by irradiation of electron ray of 10 mega rad units. The sheet was foamed with said cross-linked film being in contact with the supporting member. The foamed sheet thus obtained tended to stick to the supporting member. The cross-linked film which had a low elongation was subject to cracking, preventing the foamed sheet from presenting a smooth surface. Further, the foamed sheet noticeably shrunk upon reheating and had low thermal workability.

EXAMPLE 5

A foamed sheet obtained in Example 1 was laminated under pressure with an iron plate covered with an embossed soft vinyl chloride resin sheet on one side, which plate was heated to 120° C, while the film-laminated surface of the foamed sheet was brought into contact with the iron plate on the opposite side. Said lamination was effectively carried out because the foamed sheet was provided with a noncross-linked film skin. In contrast, a foamed sheet obtained without laminating a film thereto failed to be satisfactorily laminated with the above-mentioned iron plate. To effect lamination between said iron plate and a foamed sheet lacking a non-cross-linked film required said iron plate to be heated to a higher temperature than 160° C. However, such high temperature deformed the embossed surface of the soft vinyl chloride resin sheet coated on the iron plate.

As mentioned above, the method of this invention provides the foamed polyolefin sheet which does not stick to the supporting member and presents a very smooth surface and displays high thermal workability.

What we claim is:

1. A method of manufacturing a composite foamed polyolefin sheet which comprises the steps of laminating a film of noncross-linked thermoplastic resin free from a crosslinking agent to at least one surface of a crosslinked polyolefin base sheet containing a thermally decomposable foaming agent or a polyolefin base sheet containing a foaming agent and a crosslinking agent, and carrying out thermal foaming of said film-laminated sheet by heating said sheet on a supporting member under atmospheric pressure with the non-crosslinked resin film laminated to the sheet being in contact with the supporting member.

2. The method according to claim 1, wherein the cross-linked polyolefin base sheet is a sheet of polyolefin cross-linked by means of ionizing radiation.

3. The method according to claim 1, wherein the polyolefin is polyethylene.

4. The method according to claim 1, wherein the cross-linking agent is an organic peroxide.

5. The method according to claim 1, wherein the foaming agent is azodicarbonamide.

6. The method according to claim 1, wherein the noncross-linked film free from a cross-linking agent has a thickness of 0.05 to 1 mm.

7. The method according to claim 1, wherein the noncross-linked film free from a cross-linking agent has a thickness of 0.2 to 0.5 mm.

8. The method according to claim 1, wherein the thermoplastic resin film is a polyolefin film selected from the group consisting of low density polyethylene film, high density polyethylene film and polypropylene film.

9. The method according to claim 1, wherein the thermal foaming is carried out in the presence of the cross-linking coagent selected from the group consisting of triallyl isocyanurate and triallyl cyanurate.

10. The method according to claim 1, wherein a metal net conveyor is used as the supporting member; and hot air is blown on to the laminated sheet placed thereon.

11. The method according to claim 1, wherein the thermoplastic resin film is laminated only to one surfaces of the polyolefin base sheet.

12. The method according to claim 1, wherein the thermoplastic resin film is laminated to both surfaces of the polyolefin base sheet.

13. The method according to claim 12, wherein the thermoplastic resin film laminated to one side surface of the polyolefin base sheet has a higher gas permeability than the thermoplastic resin film laminated to the other side surface of the polyolefin base sheet and coming in contact with the supporting member during the thermal foaming.

* * * * *